United States Patent
Klomp

(10) Patent No.: US 6,397,825 B1
(45) Date of Patent: Jun. 4, 2002

(54) OXYGEN ENRICHMENT FOR AIR-ASSIST TYPE FUEL INJECTORS

(75) Inventor: Edward Daniel Klomp, Clinton Township, Macomb County, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/550,937

(22) Filed: Apr. 17, 2000

(51) Int. Cl.$^7$ .................................................. F02M 23/00
(52) U.S. Cl. ........................................ 123/533; 123/585
(58) Field of Search ................................ 123/531, 533, 123/585, 567

(56) References Cited

U.S. PATENT DOCUMENTS

| | | | | |
|---|---|---|---|---|
| 4,376,423 A | * | 3/1983 | Knapstein | 123/533 |
| 5,170,727 A | * | 12/1992 | Nielsen | 110/346 |
| 5,353,991 A | | 10/1994 | DeNagel et al. | 239/409 |
| 5,546,902 A | * | 8/1996 | Paluch et al. | 123/531 |
| 5,649,517 A | * | 7/1997 | Poola et al. | 123/585 |
| 5,730,369 A | | 3/1998 | DeNagel et al. | 239/585.4 |
| 5,960,777 A | * | 10/1999 | Nemser et al. | 123/585 |
| 6,055,808 A | * | 5/2000 | Poola et al. | 123/585 |
| 6,067,973 A | * | 5/2000 | Chanda et al. | 123/585 |
| 6,173,567 B1 | * | 1/2001 | Poola et al. | 123/585 |

* cited by examiner

*Primary Examiner*—Erick Solis
(74) *Attorney, Agent, or Firm*—George A. Grove; Jeffrey A. Sedlar

(57) ABSTRACT

A fuel system for an internal combustion engine has an air-assist fuel injection system. An oxygen generator is employed to supply oxygen-enriched air to the fuel injector to create a more readily ignitable mixture in the engine combustion chamber.

2 Claims, 1 Drawing Sheet

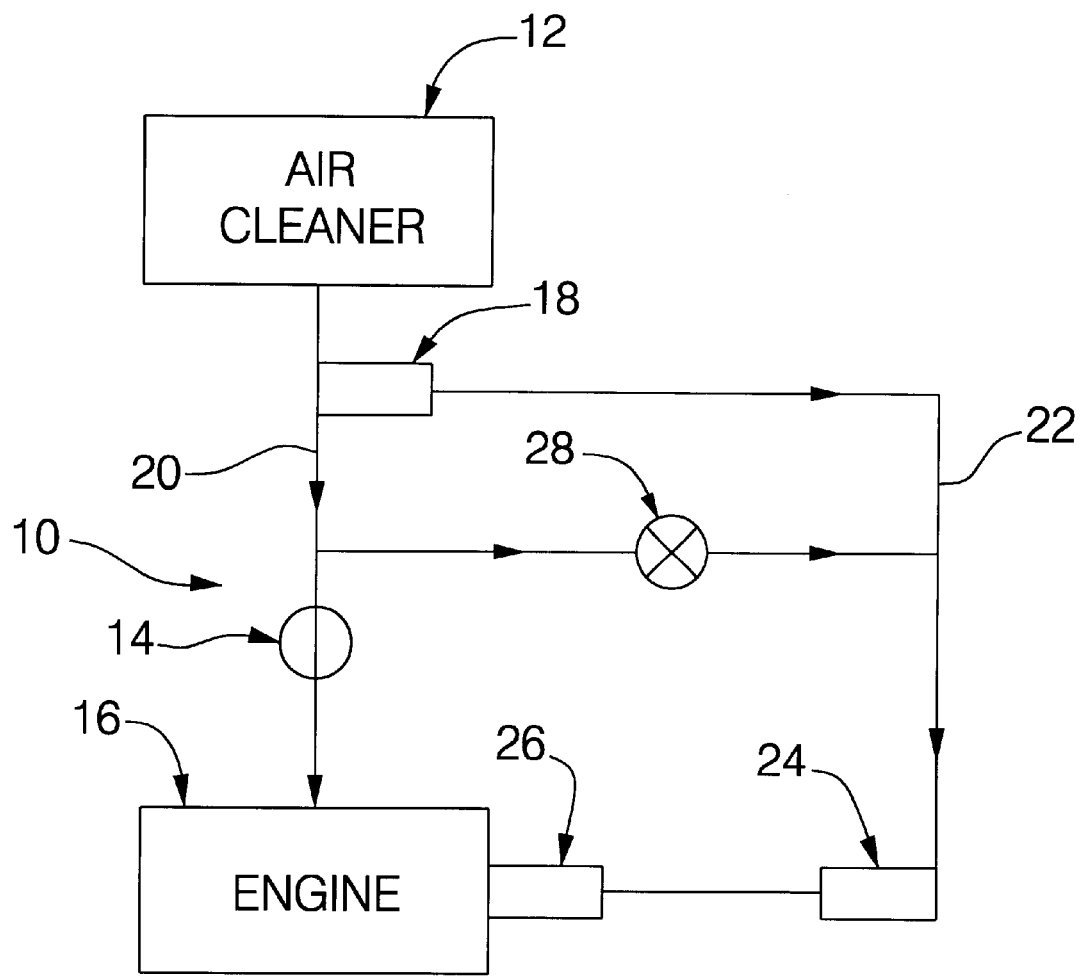

OXYGEN ENRICHMENT FOR AIR-ASSIST TYPE FUEL INJECTORS

TECHNICAL FIELD

This invention relates to air-assist fuel injection systems and more particularly to such injection systems having oxygen enrichment.

BACKGROUND OF THE INVENTION

Air-assist fuel injectors have been proposed to improve the operating efficiency and emissions of internal combustion engines. These devices mix air with a fuel charge that is then injected directly into the engine combustion cylinder. The air-assist improves the atomization and distribution of the fuel charge as it enters the air within the combustion chamber of the cylinder. Air is separately ingested in a normal manner into the engine combustion chamber and may be compressed prior to the air-assisted fuel injection.

Many air-assisted fuel injectors are known in the prior art. U.S. Pat. No. 5,353,991 issued Oct. 11, 1994 assigned to General Motors Corp. and U.S. Pat. No. 5,730,369 issued Mar. 24, 1998 assigned to General Motors Corp. are examples of air-assisted fuel injectors that might employ the present invention.

SUMMARY OF THE INVENTION

It is an object of this invention to provide an improved air-assist fuel injection system having oxygen enrichment.

In one aspect of the present invention, a compressed air stream with oxygen enrichment is supplied to a fuel injector. In another aspect of the present invention, an oxygen-permeable membrane filter is disposed upstream of the compressor that is supplying air to the injector. In yet another aspect of the present invention, an air-assist fuel injection system incorporates a membrane filter that permits a freer passage of oxygen compared to that of nitrogen.

In still another aspect of the present invention, an oxygen-enriched, air-assist fuel injection system produced improved ignitability and flame propagation rate of air/fuel mixtures in an internal combustion engine. In a further aspect of the present invention, an oxygen-enriched, air-assist fuel injection system provides improved efficiency and reduced unburned fuel emissions in an internal combustion engine. In a yet further aspect of the present invention, a leaner air/fuel ratio is available with the oxygen-enriched, air-assist fuel injection system.

An oxygen enrichment device is positioned in an air-assist fuel injection system downstream of the air filter and upstream of the throttle body in branch passage. The oxygen enrichment device permits the passage of oxygen more freely than the passage of nitrogen. The output of the oxygen enrichment device is in fluid communication with a compressor that supplies a charge of air to the fuel injector. A bypass valve controls the amount of oxygen-enriched gas flow that is supplied to the injectors. Oxygen enrichment devices are available from Compact Membrane Systems, Inc. One such device is sold under the product designation 7-2AG.

BRIEF DESCRIPTION OF THE DRAWING

The sole FIGURE is a schematic representation of an air-assist fuel injection system incorporating the present invention.

DESCRIPTION OF AN EXEMPLARY EMBODIMENT

An engine fuel system 10 has an air cleaner or filter 12 through which air is drawn for delivery through a throttle body 14 to an engine 16. The throttle body 14 is a conventional mass air flow device that permits the operator to control the air flow into the engine 16. An oxygen enrichment device 18 is positioned for fluid communication from a passage 20 that communicates between the air cleaner 12 and the throttle body 14. The fluid pressure in the passage is substantially equal to the ambient pressure minus a small pressure drop created by air flow through the air cleaner 12.

The oxygen-enriched fluid leaving the oxygen enrichment device 18 is delivered through a passage 22 to a conventional air compressor 24. The air compressor delivers the oxygen-enriched fluid to a conventional air-assist fuel injector 26. A bypass valve 28 is disposed between the passage 20 and the passage 22 to control an air flow bypass around the oxygen enrichment device 18. The bypass valve can be controlled by the operator or by the conventional engine electronic control system, not shown. As is well known, the electronic control systems for engines incorporated a programmable digital computer that controls spark timing, fuel injection timing, fuel injection amount, and other functions. The bypass valve 28 can be controlled such that the amount of oxygen-enriched flow delivered to the compressor 24 is variable between minimum and maximum percentages of oxygen enrichment. As more air is admitted through the bypass valve 28, less oxygen-enriched fluid will be supplied through the oxygen enrichment device 18.

During the intake stroke of the engine 16, air is ingested through the throttle body 14 into the combustion cylinder of the engine 16. During the compression stroke of the engine 16, oxygen-enriched air compressed by the air compressor 24 blasts fuel into the cylinder to create an air/fuel mixture in the combustion chamber of the engine 16. The air/fuel mixture is ignited by a spark plug or by compression ignition to cause a rapid rise in pressure and temperature in the combustion chamber, resulting in a power stroke at the engine 16. The enriched air-fuel mixture is closest to the point of ignition. This results in improved flame propagation and more ignitable and stable ignition of the air/fuel mixture. The engine 16 can operate at significantly leaner air/fuel ratios than a conventional air-assist fuel-injected engine because of the enriched air-fuel charge that is delivered at the source of ignition.

While the above-described oxygen-enriched fuel system employs an oxygen-permeable membrane device, other oxygen generating mechanisms can be employed. For example, a compressed oxygen container can be positioned upstream of the compressor 24 or connected directly with the fuel injector, thereby eliminating the need for a compressor. The oxygen flow could be directed through a variable orifice or restriction that would vary the oxygen content by ingesting air from the passage 20 at the throat of the restriction in a well-known manner. However, the oxygen enrichment device 18 appears to be the preferred oxygen generator in the engine fuel system.

What is claimed is:

1. A fuel injection system for an internal combustion engine comprising:

an engine combustion chamber;

an air-assist fuel injector disposed to supply fuel to the combustion chamber;

an air supply disposed to supply ambient air to the combustion chamber;

an oxygen enrichment device supplying an oxygen enriched air stream to said air-assist fuel injector;

said oxygen enrichment device comprising an oxygen permeable nitrogen retarding element supplying said oxygen enriched air stream to a compressor disposed upstream of said air-assist fuel injector; and a bypass valve disposed to supply filtered ambient air to said oxygen enriched air stream at a point between said oxygen enrichment means and said air compressor controlling the level of oxygen enrichment in said oxygen enriched air stream by reducing the flow in the oxygen enriched air stream and increasing the flow of filtered ambient air through the bypass valve and the compressor to the air-assist fuel injector.

2. A fuel injection system for an internal combustion engine comprising:

an engine combustion chamber;

an air-assist fuel injector disposed to supply fuel to the combustion chamber;

an air supply disposed to supply ambient air to the combustion chamber through a first passage;

an oxygen enrichment device supplying an oxygen enriched air stream to said air-assist fuel injector through a delivery passage;

a compressor disposed in the delivery passage between said oxygen enrichment device and said air-assist fuel injector; and a bypass valve disposed in a second passage that extends between the first passage and the delivery passage, said bypass valve supplying non-enriched air from said air supply to said oxygen enriched air stream in said delivery passage at a point between said oxygen enrichment device and said air compressor diverting flow from the oxygen enrichment device.

* * * * *